United States Patent [19]

Iwasaki et al.

[11] Patent Number: 4,814,430

[45] Date of Patent: Mar. 21, 1989

[54] PROCESS FOR PRODUCING POLY(ARYLENE SULFIDE) OF REDUCED ALKALI METAL CONTENT

[75] Inventors: Takao Iwasaki; Yo Iizuka; Takayuki Katto; Zenya Shiiki, all of Iwaki, Japan

[73] Assignee: Kureha Kagaku Kogyo Kabushiki Kaisha, Tokyo, Japan

[21] Appl. No.: 42,277

[22] Filed: Apr. 24, 1987

[30] Foreign Application Priority Data

Apr. 28, 1986 [JP] Japan ................... 61-98487

[51] Int. Cl.$^4$ ............................................. C08G 75/16
[52] U.S. Cl. .................................. 528/388; 528/487; 528/490; 528/499
[58] Field of Search ............... 528/388, 487, 490, 499

[56] References Cited

U.S. PATENT DOCUMENTS 4,071,509  1/1978  Edmonds ............................. 260/79
4,645,826  2/1987  Iizuka et al. ....................... 528/388

FOREIGN PATENT DOCUMENTS 0140272   5/1985   European Pat. Off. .
166368    1/1986   European Pat. Off. .
55-156342 7/1980   Japan .
57-108135 12/1980  Japan .
0202222   11/1984  Japan .
59-219331 12/1984  Japan .
1225217   10/1986  Japan .
1228023   10/1986  Japan .
1287927   12/1986  Japan .

Primary Examiner—Harold D. Anderson
Attorney, Agent, or Firm—Oblon, Fisher, Spivak, McClelland & Maier

[57] ABSTRACT

Disclosed herein is a novel process for producing a substantially linear PAS which contains an electrolytic alkali metal of not more than 50 ppm, shows a melt viscosity of 10 to 300 poise (measured at 310° C. and at a shear rate of 10,000 sec$^{-1}$) and is suitable as a resin for packaging electronic parts.

8 Claims, No Drawings

PROCESS FOR PRODUCING POLY(ARYLENE SULFIDE) OF REDUCED ALKALI METAL CONTENT

BACKGROUND OF THE INVENTION

The present invention relates to a process for producing a poly(arylene sulfide) (hereinafter referred to as PAS), and more in detail, the present invention relates to a novel process for producing a substantially linear PAS which contains an electrolytic alkali metal of not more than 50 ppm, shows a melt viscosity of not more than 300 poise (measured at 310° C. and at a shear rate of 10,000 sec$^{-1}$) and is suitable as a resin for packaging electronic parts.

Packaging of the electronic parts, for instance, IC, transistors, diodes, capacitors, etc. with a resin has been broadly carried out for the purpose of preserving the electric insulating property thereof, mechanically protecting the parts and preventing the change of the specific properties thereof due to the external atmosphere. Hitherto the packaging by the resins has been usually carried out by the transfermolding while using a thermosetting resin such as epoxy resin, silicone resin, etc.

As a packaging material, theremoplastic resins which show high productivity at the time of molding, heat-resistance, high fluidity and low content of electrolytes, are considered to be suitable.

Although the PASs represented by poly(phenylene sulfide) which have the properties of high fluidity and low melt viscosity, seem to be suitable for packaging material, PASs having a low content of the electrolytes have been very difficult to be obtained by the conventional process without subjecting to a certain special and complicated extraction. Accordingly, it is difficult to use the conventional PASs for the packaging materials which are vitally damaged by contamination of electrolytes.

In order to obtain a resin which is low in the content of the electrolytes, the extraction of a polymerized PAS with an organic polar solvent has been once tried. However, there is a problem that such an extraction is an economically significantly disadvantageous method and is not to be put to practical use.

For instance, a process for removing sodium chloride from a poly(phenylene sulfide) resin, comprising contacting the resin with a mixed solvent comprising a polar and aprotic solvent, and ethylene glycol [refer to Japanese Patent Application Laid-Open (KOKAI) No. 57-108135 (1982)], a process for purifying a poly(phenylene sulfide), which comprises heating the poly(phenylene sulfide) containing imprities comprising electrolytic components in an organic amide solvent in the presence of a polyoxyalkylene compound, thereby reducing the content of the electrolytic components [refer to Japanese Patent Application Laid-Open (KOKAI) No. 59-15430 (1984)] or so, have been proposed.

On the other hand, as for producing process of PAS, a process of reacting a dihaloaromatic compound with sodium sulfide in an organic amide solvent such as N-methyl-2-pyrrolidone or a process of adding a salt of a carboxylic acid to the said polymerization system has been conventional process [refer to Japanese Patent Publications No. 45-3368 (1970) and No. 52-12240 (1977)].

However, when PAS having a sufficiently low melt viscosity for exhibiting the high fluidity are tried to be obtained by these conventional producing process, a reaction mixture containing a large amount of the polymers of extremely low molecular weight and oligomers as well as a desired polymer having a properly low melt viscosity is obtained at the time of terminating the polymerization reaction. Accordingly, in PAS recovered from the reaction mixture, a large amount of the polymers of extremely low in molecular weight, oligomers and electrolytes, particularly alkali metals are mingled. Besides, the electrolytes are difficult to be removed from the PPS by the usual washing treatment and accordingly, it is difficult to obtain PAS of a low content of the electrolytes.

On the other hand, the present inventors have previously proposed, as a new process for producing a substantially linear PAS of a high melt viscosity by continuing the polymerization while adding water on the way of the polymerization and maintaining the polymerization temperature in high, that is, a new process for producing a high molecular weight PAS of a melt viscosity of more than 1,000 poise (measured at 310° C. and at a shear rate of 200 sec$^{-1}$), wherein PAS is obtained by reacting an alkali metal sulfide with a dihaloaromatic compound in an organic amide solvent.

More in detail, the proposed process comprises the steps of (1) carrying out the reaction at a temperature of from 180° to 235° C. in the presence of from 0.5 to 2.4 mol of water per mol of the alkali metal sulfide, thereby forming a PAS of a melt viscosity of from 5 to 300 poise at a conversion rate of the dihaloaromatic compound of from 50 to 98 mol % and (2) continuing the reaction by adding water so that from 2.5 to 7.0 mol of water per mol of the alkali metal sulfide is present and by raising the temperature of the reaction system to from 245° to 290° C. [refer to Japanese Patent Application Laid-Open(KOKAI) No. 61-7332(1986)].

However, although the thus proposed process is a suitable process for producing a substantially linear PAS of a high melt viscosity, it is not necessarily a suitable process for producing a PAS of a sufficiently low melt viscosity for exhibiting a high fluidity.

As a result of the present inventors' extentive studies for producing a PAS of a low content of the electrolytes and of a high fluidity, a process has been found by the present inventors whereby a PAS of a low content of the electrolytes and of a low melt viscosity can be produced economically, and on the basis of the finding, the present invention have been attained.

SUMMARY OF THE INVENTION

In an aspect of the present invention, there is provided a process for producing a PAS of a high fluidity, namely a PAS of a low melt viscosity, comprising the steps of:

[A] reacting an alkali metal sulfide with from 1.0 to 2.0 mol of a dihaloaromatic compound per mol of the alkali metal sulfide at a temperature of from 180° to 235° C. in a state wherein from 0.5 to 2.4 mol of water per mol of the alkali metal sulfide is present so that the conversion rate of the dihaloaromatic compound is not less than 50% of the theoretically necessary amount and the melt viscosity (measured at 310° C. and at a shear rate of 10,000 sec$^{-1}$) of the thus formed PAS is less than 5 poise,

[B] continuing the reaction while adding water to the reaction system so that from 2.5 to 7.0 mol of water per mol of the alkali metal sulfide is present in the reaction system and raising the temperature of the reaction system to from 250° to 290° C. so that the melt viscosity (measured at 310° C. and at a shear rate of 10,000 sec$^{-1}$) of the thus formed PAS is not less than 5 times of that of the PAS formed in the step[A] but not more than 300 poise, and

[C] after separating the PAS formed in the step[B] from the polymerization reaction mixture, treating the thus separated PAS in an aqueous solution (pH: less than 2) of a strong acid or an aqueous 0.1 to 30% by weight solution of a salt of a weak base and the strong acid for from 1 to 500 minutes at a temperature of from 0° to 200° C., thereby obtaining a PAS of an extremely low content of the alkali metal and of a low melt viscosity without subjecting the thus formed PAS to a special extraction treatment or washing treatment, because the specific surface area of the particles of the thus formed PAS is large enough to be easily washed.

DETAILED DESCRIPTION OF THE INVENTION

The process for producing PAS according to the present invention comprises reacting between an alkali metal compound and a dihaloaromatic compound in an organic amide solvent. In the case where the water of the alkali metal compound, namely, one of the starting materials, is too large, it is preferable to remove the excessive amount of water preliminarily by a distillation, etc. in advance of the polymerization reaction. As an apparatus in which the dehydration reaction and polymerization reaction are carried out, the apparatus which is excellent in heat-resistance, pressure-resistance and corrosion-resistance is preferable. Particularly, it is preferable to constitute the part of the apparatus (the reaction vessel), to which the liquid reactant contacts ordinarily, with titanium. In the case of using a reaction vessel made of or lined with titanium, the decomposition reaction due to the coexisting water is reduced and also the content of the impurities in the thus obtained polymer (PAS) is reduced as compared to the case of using a reaction vessel made of stainless-steel.

As an alkali metal sulfide used according to the present invention, lithium sulfide, sodium sulfide, potassium sulfide, rubidium sulfide, cesium sulfide and a mixture thereof may be exemplified. Since the alkali metal sulfide is usually a hydrate or an aqueous mixture, it is preferable to subject the alkali metal sulfide to dehydrating operation for adjusting the water content in advance of the polymerization reaction. In the above-mentioned metal sulfide, the ones generated in situ are included, as a matter of fact.

Amont the metal sulfides, sodium sulfide is most cheap and is industrially preferable.

Furthermore, in order to react an alkali metal polysulfide or an alkali metal thiosulfate, which is present in a very small amount in the alkali metal sulfide, a small amount of an alkali metal hydroxide can be used together with the alkali metal sulfide, whereby it is able to remove such impurities or to change such impurities to harmless matters.

As the industrial starting material of the alkali metal sulfide, crystalline sodium sulfide pentahydrate is most excellent among the commercialized alkali metal sulfides.

As a dihaloaromatic compound used according to the present invention, the dihaloaromatic compounds such as those disclosed in Japanese Patent Application Laid-Open (KOKAI) No. 59-22926 (1984) may be exemplified. Particularly, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; 4,4'-dichlorodiphenyl ketone and the like are preferable. Of the compounds, the compound mainly composed of p-dihalobenzene represented by p-dichlobenzene as the main component is more preferable.

By a suitable, selective combination of the dihaloaromatic compounds, it is possible to obtain a copolymer containing not less than two different reaction units. For instance, in the case where p-dichlorobenzene is used in combination with m-dichlorobenzene or 4,4'-dichlorodiphenylsulfone, a copolymer containing

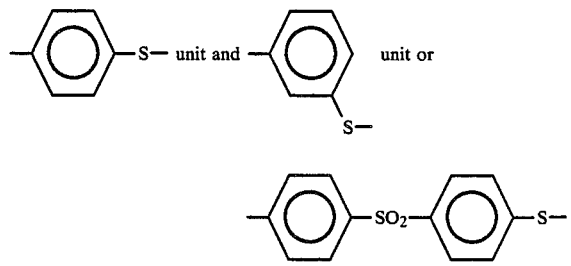

unit can be obtained. As the thus obtained copolymer, a block-copolymer is preferable to a random-copolymer.

Furthermore, although PAS according to the present invention is a polymer derived from the dihaloaromatic compounds, it is also possible to use a monohalo compound (not necessarily an aromatic compound) in combination with the dihaloaromatic compound in order to form the terminal of the thus formed polymer or to regulate the polymerization reaction and/or the molecular weight of the polymer.

According to the present invention, it is possible to obtain PAS having the desired fluidity by polymerization without substantially adding a cross-linking agent and/or a branching agent, however, the polymerization carried out in the presence of a small amount of a cross-linking agent (trihalobenzene, etc.) which the amount thereof is in an extent not to deteriorate the processability and the physical properties of the thus formed polymer, does not change the heart of the present invention.

The amount of the charged dihaloaromatic compound per mol of the effective amount of the charged alkali metal sulfide is from 1.0 to 2.0 mol, preferably from 1.05 to 2.0 mol, more preferably from 1.1 to 1.7 mol. In the case where the amount of the charged dihaloaromatic compound is less than 1.0 mol, the decomposition reaction of the solvent and/or the thus formed polymer is apt to be caused and accordingly, such a situation is not preferable. On the other hand, in the case where the amount of the charged dihaloaromatic compound is more than 2.0 mol, it is difficult to obtain a polymer which is suitable for melt-processing and has a melt viscosity of not less than 10 poise, and accordingly such a situation is not preferable.

As an organic amide solvent (including an organic carbamic acid amide) used in the polymerization reaction according to the present invention, N-methyl-2-pyrrolidone (hereinafter referred to as NMP); N-ethyl- 2-pyrrolidone; N,N-dimethylformamide; N,N-dimethylacetamide; N-methylcaprolactam; tetramethylurea; dimethylimidazolidinone; hexamethyl phosphoric acid triamide and a mixture thereof may be exemplified. Among the above-mentioned compounds, NMP is particularly preferable. It is preferable that the organic amide as the solvent for polymerization is an aprotic compound.

The amount of the organic amide solvent used in the reaction is preferably in the range of from 0.2 to 5 kg per mol of the effective amount of the charged alkali metal sulfide.

The polymerization according to the present invention is carried out by a process comprising at least two steps shown below, which depend on the amount of water present in the polymerization reaction system and the reaction temperature. The "at least two steps" mean that any auxiliary step(s) may be added before, after or between the two steps provided that the effect of the present invention resulting from the combination of the two steps is realized.

The 1st polymerization step (the preliminary polymerization process) according to the present invention comprises introducing the dihaloaromatic compound in the total amount of from 1.0 to 2.0 mol, preferably from 1.05 to 2.0 mol and more preferably from 1.1 to 1.7 mol per mol of the effective amount of the alkali metal sulfide charged into a reactor, and subjecting the dihaloaromatic compound to polymerization reaction in the presence of water in the amount of from 0.5 to 2.4 mol, preferably from 0.8 to 2.2 mol and more preferably, from 1.0 to 2.0 mol per mol of the effective amount of the charged alkali metal sulfide at a temperature of from 180° to 235° C., preferably from 200° to 230° C., while continuing polymerization until the conversion rate of the dihaloaromatic compound attains to not less than 50 mol % of the theoretically necessary amount but the melt viscosity (measured at 310° C. and a shear rate of 10,000 sec$^{-1}$) does not exceed 5 poise.

In actually carrying out the 1st polymerization step, the alkali metal sulfide usually containing water is charged into the organic amide solvent and the thus obtained mixture is heated to distill the excessive water out from the reaction system. At that time, a part of the alkali metal sulfide decomposes into an alkali and hydrogen sulfide (hereinafter referred to as $H_2S$). From the generated amount of $H_2S$, the effective amount of the charged alkali metal sulfide is calculated. Thereafter, the dihaloaromatic compound is charged into the reaction system in an amount calculated from the effective amount of the charged alkali metal sulfide and the thus obtained mixture are heated to a temperature of from 180° to 235° C. in an inert atmosphere, thereby subjecting to polymerization reaction.

The amount of water coexistent with the polymerization reaction is in a range of from 0.5 to 2.4 mol per mol of the alkali metal sulfide and particularly, the coexistent water in an amount from 0.8 to 2.2 mol is preferable, since the PAS which has high fluidity and has a low content of the electrolytes is easily formed. In order to make the amount of the coexistent water to less than 0.5 mol, it takes a large amount of energy and much time for dehydration and accordingly, such a situation is not preferable. On the other hand, in the case where the amount of the coexistent water is more than 2.4 mol, the polymerization degree of the thus formed polymer (PAS) becomes smaller, and in the case where the amount of the coexistent water becomes far larger, the decomposition of the solvent is apt to be caused and accordingly such a situation is not preferable.

In the case where the water content of the alkali metal sulfide used in the reaction is larger than the amount of water prescribed in the present invention, the amount of the coexistent water is adjusted by carrying out the dehydrating treatment in advance of the reaction.

The 1st polymerization is carried out at a temperature in a range of from 180° to 235° C. In the case where the reaction temperature is too low, the reaction rate is too slow, and in the case where the reaction temperature is more than 235° C., PAS (and the solvent) is apt to begin the decomposition and accordingly, the two cases are not preferable.

The amount of the dihaloaromatic compound used in the reaction is preferably from 1.0 to 2.0 mol per mol of the effective amount of the charged alkali metal sulfide, and the amount ranging from 1.05 to 2.0 mol, particularly the range of from 1.1 to 1.7 mol is preferable for obtaining PAS of a high fluidity.

In the case where the amount of the dihaloaromatic compound is less than 1.0 mol, the thus formed PAS and the solvent is apt to begin the decomposition, and in the case where the amount is more than 2.0 mol, the polymerization reaction rate becomes slower and accordingly, the two cases are not preferable.

The termination of the preliminary polymerization (1st polymerization), namely the timing of turning from the preliminary polymerization to two-phase separation polymerization (2nd polymerization) is the point wherein the conversion rate of the dihaloaromatic compound in the reaction system reaches not less than 50 mol %, preferably not less than 70 mol % and more preferably not less than 90 mol % of the theoretical conversion. In the case where the turning is carried out at the point where the conversion rate is less than 50 mol %, the unpreferable reactions such as decomposition, etc. occur in the case of carrying out the 2nd polymerization.

The theoretical conversion of the dihaloaromatic compound has been calculated from the following formula. (a) In the case wherein the dihaloaromatic compound (hereinafter referred to as DHA) has been added in excess (by molar ratio) of the alkali metal sulfide:

$$\text{Conversion rate} = \frac{X - Y}{X - Z} \times 100$$

(b) In the cases other than (a):

$$\text{Conversion rate} = \frac{X - Y}{X} \times 100$$

wherein X is the amount of the charged DHA; Y is the remaining amount of DHA and Z is the excessive amount of DHA in mol.

And, at the point where the 1st polymerization step is turned over to the 2nd polymerization step, the melt viscosity of PAS is not more than 5 poise, preferably not more than 4 poise and more preferably not more than 3 poise.

In the case of not more than 5 poise, the situation is suitable for obtaining the PAS of low melt viscosity, however, in the case of more than 5 poise, the PAS which is finally obtained shows a high melt viscosity and a low fluidity, and such a situation is not preferable.

In the 2nd polymerization step (two-phase separation polymerization), water is added to the reaction slurry so that the total amount of water in the polymerization system is increased to from 2.5 to 7 mol, preferably to from 3.0 to 5 mol per mol of the effective amount of the charged alkali metal sulfide; the reaction mixture of the polymerization system is heated to a temperature of from 250° to 290° C., preferably from 255° to 280° C. and more preferably from 260° to 270° C. and the polymerization is continued until the melt viscosity of the thus formed polymer is raised to not less than 5 times of the melt viscosity of the PAS formed in the 1st polymerization step but not more than 300 poise. By the 2nd polymerization step, a PAS of a melt viscosity of from 10 to 300 poise is obtained.

In the case where the total amount of water in the 2nd polymerization system is less than 2.5 mol, the decomposition of PAS and the solvent occur and accordingly, such a situation is not preferable. Furthermore, in the case of more than 7 mol, the specific surface area of the thus obtained PAS usually becomes not more than 10 $m^2/g$ and it is difficult to remove the electrolytes therefrom only by washing the thus formed PAS and accordingly, such a situation is not also preferable. In the case where the temperature of the 2nd polymerization is less than 250° C., only the powderly PAS of a high content of the electrolytes is obtained and accordingly, such a situation is not preferable. On the other hand, in the case of more than 290° C., since the thus formed PAS and the solvent tends to decompose, such a situation is not preferable.

The 2nd polymerization step of the present invention wherein two phases comprising a polymer predominant liquid phase and a solvent predominant liquid phase are formed, is a step wherein the PAS formed in the 1st polymerization step is further polymerized so as to remarkably increase the melt viscosity and at the same time the electrolytes are discharged from the polymer predominant phase to the solvent predominant phase. Accordingly the duration of the 2nd polymerization is decided from the view points, and concretely, the duration of the 2nd polymerization is from 0.5 to 20 hours, preferably from 1 to 10 hours.

In the case where the duration of the 2nd polymerization is too short, only PAS of the low melt viscosity of not more than 10 poise is obtained, and on the other hand, in the case where the duration is too long, the decomposition of PAS occurs and accordingly, the two cases are not preferable. The resin used in injection molding for packaging is preferably the resin of a high fluidity, namely, the resin of a low melt viscosity. However, the resin of an extremely low melt viscosity of not more than 10 poise is difficult to process and the thus molded articles are poor in mechanical properties.

The turning from the 1st polymerization to the 2nd polymerization may be carried out by transferring the slurry in the 1st polymerization vessel to the other reaction vessel and subjecting the slurry to the 2nd polymerization conditions, or may be carried out the 1st and the 2nd polymerizations in the same reaction vessel by changing the polymerization conditions.

The addition of water may be carried out after termination of the 1st polymerization, namely at the point just before the raising of the temperature to the polymerization temperature of the 2nd polymerization, during the raising of the temperature or just after the raising of the temperature to the polymerization temperature of the 2nd polymerization. The most preferable result is obtained by the addition of water just before the raising of the temperature.

Still more, when carrying out the 2nd polymerization, it is possible to add a small amount of an alkali such as an alkali metal hydroxide and an alkali earth metal hydroxide to the polymerization system. There are cases of increasing the stability of the solvent and the thus formed polymer.

Furthermore, although it is not particularly necessary, various salts, for instance, alkali metal carboxylate, alkali earth metal carboxylate, alkali metal sulfonate, lithium chloride, lithium carbonate and potassium fluoride may be added during the polymerization of the present invention in the range of not substantially raising the content of the electrolytes in the thus recovered polymer.

As the after-treatment for recovering PAS formed in the polymerization according to the present invention, the following method is carried out, particularly for obtaining PAS of a remarkably low content of the electrolytes.

The thus formed PAS is separated from the liquid polymerization reaction mixture and the thus separated PAS is treated (washed) with an aqueous acidic solution at a temperature of from 0° to 200° C., preferably from 15° to 100° C. for from 1 to 500 min, washed with water and dried to be recovered.

The aqueous acidic solution comprises (1) an aqueous solution of a strong acid, which shows the pH of less than 2, preferably not more than 1 or (2) an aqueous 0.1 to 30% by weight, preferably 0.5 to 20% by weight, more preferably 0.5 to 5% by weight solution of a salt formed from the strong acid and a weak base.

In advance of the treatment of PAS with the aqueous acidic solution, it is preferable to wash the crude PAS with an organic solvent, for instance, acetone and methanol and then with water. Furthermore, it is preferable for obtaining PAS of a low content of the electrolytes to wash the PAS, which has been treated with the aqueous acidic solution, with an organic solvent, for instance, acetone and methanol and thereafter with water.

As the said strong acid, hydrochloric acid, sulfuric acid and phosphoric acid are preferable, and ammonium salt of the strong acid is also preferable.

The PAS obtained according to the process of the present invention has a specific surface area of not less than 10 $m^2/g$, preferably not less than 20 $m^2/g$; a content in the PAS of the alkali metals of not more than 50 ppm, preferably not more than 30 ppm and an amount of extracted $Na^+$ by hot water of 160° C. of not more than 10 ppm, preferably not more than 5 ppm, and shows a melt viscosity of from 10 to 300 poise. Namely, the PAS according to the present invention has the fluidity suitable for injection molding processing, particularly molding processing of the packaging material and the mechanical strength.

Accordingly, the PAS obtained according to the process of the present invention is extremely useful as the base resin in the fields having aversion to the electrolytes, for instance, in the field of packaging material.

Furthermore, a mixture prepared by filling up the polymer (PAS) of the present invention with a powdery filler such as silica powder, calcium silicate powder, talc, kaolin, glass powder, carbon black, calcium carbonate powder and titanium oxide powder, and/or a fibrous filler such as carbon fibers, glass fibers, potassium titanate fibers, calcium silicate fibers, calcium sulfate fibers, silica fibers, alumina fibers, zirconia fibers and polyamide fibers can be used.

Still more, a mixture prepared by mixing PAS of the present invention with one or more of the synthetic resins such as polyolefin, EP rubber, silicone rubber, acrylic rubber, polyisobutylene, hydrogenated SBR, fluorocarbon resin, fluorocarbon rubber, polycarbonate, poly(phenylene oxide), polysulfone, polyarylene, polyacetal, polyimide, polyamide (including aramide), polyester (including LCP), polyestersulfone, polyetheretherketone, polyetherimide, polyestercarbonate, polystyrene, polymethylmethacrylate, ABS or so can be used.

The present invention will be concretely explained while referring to the following non-limitative Examples

EXAMPLE 1

Into an autoclave of 10 liters, 5 kg of NMP and crystals of sodium sulfide pentahydrate containing 45.94% by weight of $Na_2S$ (11.0 mol as $Na_2S$) (made by NAGAO Soda Co.) were introduced, and the content of the autoclave was slowly heated to 203° C. in a nitrogen atmosphere within 2 hours under agitation, thereby distilling 0.85 kg of water, 0.95 kg of NMP and 0.33 mol of hydrogen sulfide off from the autoclave (a part of sodium sulfide was decomposed into the alkali and hydrogen sulfide and as a result 10.67 mol of sodium sulfide remained as the effective charging amount).

After adding a small amount of water into the autoclave to adjust the water in the system to 16.0 mol, 12.3 mol of p-dichlorobenzene (hereinafter referred to as p-DCB) and 1.3 kg of NMP were introduced into the autoclave, and the content of the autoclave was subjected to polymerization for hours at 215° C. to obtain a polymerization slurry of the preliminary polymerization.

After sampling a minute amount of the thus formed slurry, the conversion rate of p-DCB to the theoretically necessary amount was measured. The thus measured conversion rate was 89 mol %. Furtheremore, plate sheet were obtained by melt-pressing at 320° C. for two min. the polyphenylene sulfide (hereinafter referred to as PPS) powder of the thus sampled specimen without carrying out the preliminary heating. The melt viscosity thereof was measured at 310° C. (with preliminary heating up for 5 min) by using a KOKA-type flow tester. The melt viscosity was not larger than 3 poise at 310° C. and at a shear rate of 10,000 $sec^{-1}$.

After adding water to the reaction system so that the amount of water in the reaction system became 37.3 mol, the system was heated to 262° C. in an atmosphere of nitrogen, thereby subjecting to polymerization for 1.25 hours. After cooling, the thus formed granular PPS was screened from NMP and oligomer of PPS, etc. by using a sieve of the mesh size of about 0.1 mm. After washing the thus screened PPS with acetone and then water, the thus treated PPS was further washed with an aqueous 1% solution of ammonium chloride at 40° C. for 30 min.

By further washing the thus washed PPS with water, then with acetone and further with water, the refined PPS was obtained.

The thus obtained PPS showed the melt viscosity of 40 poise (at 310° C. and at a shear rate of 10,000 $sec^{-1}$), the specific surface area of 31 $m^2/g$ and the content in the PPS of sodium of 30 ppm, and the amount of $Na^+$ by extraction with hot water at 160° C. was 2 ppm to the PPS.

Further, the conversion rate of p-DCB to the theoretically necessary amount in the reaction was calculated from the amount of remaining p-DCB in the reaction mixture obtained by the gaschromatography.

The content of sodium in PPS was obtained by decomposing PPS with an aqueous hydrogen peroxide solution acidified by sulfuric acid and analysing the thus obtained aqueous solution by the ICP method (Induced Coupled Plasma Emission Spectrography).

The amount of extracted $Na^+$ was obtained by dispersing 5 g of PPS into 50 ml of a de-ionized water, heating the thus obtained aqueous dispersion for 20 hours at 260° C. and analyzing the thus extraction liquid by ICP method.

The specific surface area of the polymer (PPS) was measured by BET method (Nitrogen Adsorption Method).

EXAMPLE 2

Into an autoclave of 10 liters, 5 kg of NMP and crystals of sodium sulfide pentahydrate containing 45.94% by weight of $Na_2S$ (11.0 mol as $Na_2S$) made by NAGAO Soda Co.) were introduced, and the content of the autoclave was slowly heated to 203° C. in a nitrogen atmosphere in 2 hours under agitation, thereby distilling 0.86 kg of water, 1.0 kg of NMP and 0.37 mol of hydrogen sulfide off from the autoclave (10.63 mol of sodium sulfide remained as the effective charging amount).

After adding a small amount of water into the autoclave to adjust the water in the system to 16.5 mol, 12.75 mol of p-DCB, and 1.3 kg of NMP were introduced into the autoclave, and the content of the autoclave was subjected to polymerization for 3 hours at 210° C. and further for 3 hours at 220° C. to obtain the polymerization slurry of the preliminary polymerization.

The conversion rate of p-DCB to the theoretically necessary amount in the reaction was measured by the same method as in Example 1, and the conversion was 91 mol %. Furthermore, the melt viscosity of the sampled specimen of PPS (measured at 310° C. and at a shear rate of 10,000 $sec^{-1}$) was not more than 3 poise.

After adding water to the reaction system so that the amount of water in the reaction system became 38.3 mol, the system was heated to 263° C. in a nitrogen atmosphere, thereby subjecting the system to polymerization for 1.2 hours. After polymerization was over, the reaction system was treated in the same manner as in Example 1 to obtain PPS, which showed the melt viscosity of 50 poise (measured at 310° C. and at a shear rate of 10,000 $sec^{-1}$), the specific surface area of 28 $m^2/g$, the content of Na of 22 ppm and the amount of extracted $Na^+$ of 2 ppm.

EXAMPLE 3

Into an autoclave of 10 liters, 5 kg of NMP and crystals of sodium sulfide pentahydrate containing 45.94% by weight of $Na_2S$ (11.0 mol as $Na_2S$) (made by NAGAO Soda Co.) were introduced, and the content of the autoclave was slowly heated to 202° C. within about 2 hours under agitation, thereby distilling 0.83 kg of water, 0.90 kg of NMP and 0.27 mol of hydrogen sulfide off from the autoclave (10.73 mol of sodium sulfide remained as the effective charging amount).

After adding a small amount of water into the autoclave to adjust the water in the system to 17.2 mol, 11.80 mol of p-DCB, 0.54 mol of m-dichlorobenzene (hereinafter referred to as m-DCB) and 1.3 kg of NMP were introduced into the autoclave, and the content of the autoclave was subjected to polymerization for 4 hours at 210° C. and further for 4 hours at 220° C. to obtain a polymerization slurry of the preliminary polymerization.

The conversion rate of the dihaloaromatic compounds to the theoretically necessary amount was measured by the same manner as in Example 1 to find out that the conversion rate was 88 mol %. Further, the melt viscosity of the thus formed polymer measured on the sampled specimen was not more than 3 poise (at 310° C. and at a shear rate of 10,000 sec$^{-1}$).

After adding water to the reaction system so that the amount of water in the reaction system became 36.5 mol, the system was heated to 259° C. in a nitrogen atmosphere, thereby subjecting the system to polymerization for 1.6 hours. After the polymerization was over, the reaction system was treated in the same manner as in Example 1 except for using an aqueous solution of pH of 0.9 of hydrochloric acid instead of using the aqueous 1% solution of ammonium chloride in Example 1 to obtain the polymer, which showed the melt viscosity (measured at 310° C. and at a shear rate of 10,000 sec$^{-1}$) of 30 poise, the specific surface area of 25 m$^2$/g, the content of Na of 28 ppm and the amount of extracted Na$^+$ of 3 ppm.

COMPARATIVE EXAMPLE 1

In the same manner as in Example 1 except for introducing 8.5 mol of p DCB instead of 12.3 mol of p-DCB in Example 1, a polymerization reaction was carried out. However, the liquid reaction mixture after the 1st polymerization (the preliminary polymerization) was found to be decomposed into a black matter giving out a bad smell and accordingly, the 2nd polymerization was stopped.

COMPARATIVE EXAMPLE 2

In the same manner as in Example 1 except for introducing 32.3 mol of p-DCB instead of 12.3 mol of p-DCB in Example 1, a polymerization and an after-treatment were carried out.

The melt viscosity of the thus obtained PPS measured at 310° C. and at a shear rate of 10,000 sec$^{-1}$ was not more than 3 poise.

COMPARATIVE EXAMPLE 3

In the same manner as in Example 1 except for making the amount of water coexisting in the 1st polymerization to 42.7 mol instead of 16.0 mol in Example 1, a polymerization was carried out. However, the liquid reaction mixture after the 1st polymerization (the preliminary polymerization) was found to be decomposed to change the colour giving out a bad smell and accordingly the 2nd polymerization was stopped.

COMPARATIVE EXAMPLE 4

In the same manner as in Example 1 except for carrying out the 1st polymerization (the preliminary polymerization) for 20 hours at 160° C. instead of 6 hours at 215° C. in Example 1, the polymerization and the after-treatment were carried out. In spite of carrying out the 1st polymerization for 20 hours, the conversion rate of p-DCB to the theoretical amount of reaction was not more than 30 mol %.

Although the 2nd ploymerization (the two-phase separation polymerization) was carried out, the liquid reaction mixture was found to be decomposed into a black matter giving out a bad smell.

The thus formed PPS was black in colour and its melt viscosity (measured at 310° C. and at shear rate of 10,000 sec$^{-1}$) was not more than 3 poise.

COMPARATIVE EXAMPLE 5

In the same manner as in Example 1 except for carrying out the 1st polymerization (the preliminary polymerization) for 1 hour at 270° C. instead of 6 hours at 215° C. in Example 1, the polymerization and the after-treatment were carried out. Namely, although some decomposition was recognized in the liquid reaction mixture after the 1st polymerization, the 2nd polymerization was carried out. The thus formed PPS showed a black colour and its melt viscosity (measured at 310° C. and at a shear rate of 10,000 sec$^{-1}$) was not more than 3 poise.

COMPARATIVE EXAMPLE 6

In the same manner as in Example 1 except for carrying out the 1st polymerization (the preliminary polymerization) for one hour instead of 6 hours in Example 1, the polymerization and the after-treatment were carried out. The conversion rate of p-DCB by the 1st polymerization to the theoretical amount of reaction was about 40 mol %. Although the 2nd polymerization (the two-phase separation polymerization) was carried out, the liquid reaction mixture was found to be decomposed into a black matter giving out a bad smell. The thus formed PPS showed a black colour and its melt viscosity (measured at 310° C. and at a shear rate of 10,000 sec$^{-1}$) was not more than 3 poise.

COMPARATIVE EXAMPLE 7

In the same manner as in Example 1 except for introducing 11.0 mol of p-DCB instead of 12.3 mol of p-DCB in Example 1, the polymerization and the after-treatment were carried out. The melt viscosity of the thus formed polymer after the 1st polymerization (measured at 310° C. and at a shear rate of 10,000 sec$^{-1}$) was 15 poise. The PPS obtained after the after-treatment showed the melt viscosity (measured at 310° C. and at a shear rate of 10,000 sec$^{-1}$) of 1100 poise, the content of Na of 110 ppm and the amount of extracted Na$^+$ of 30 ppm.

COMPARATIVE EXAMPLE 8

In the same manner as in Example 1 except for making the amount of coexisting water in the 2nd polymerization (the two-phase separation polymerization) to 22.4 mol instead of 16.0 mol in Example 1, the polymerization was carried out. The liquid reaction mixture after the 2nd polymerization was found to be decomposed into a black matter giving out a bad smell. The thus formed PPS showed a black colour and its melt viscosity (measured at 310° C. and at a shear rate of 10,000 sec$^{-1}$) was not more than 3 poise.

COMPARATIVE EXAMPLE 9

In the same manner as in Example 1 except for making the amount of coexisting water in the 2nd polymerization (the two-phase separation polymerization) to 128 mol instead of 16.0 mol in Example 1, the polymerization and the after-treatment were carried out.

The thus obtained PPS showed the melt viscosity (measured at 310° C. and at a shear rate of 10,000 sec$^{-1}$) of 30 poise, the specific surface area of 5 m$^2$/g, the content of Na of 320 ppm and the amount of extracted Na$^+$ of 120 ppm.

COMPARATIVE EXAMPLE 10

In the same manner as in Example 1 except for carrying out the 2nd polymerization (the two-phase separation polymerization) at a reaction temperature of 220° C. instead of 262° C. in Example 1, the polymerization and the after-treatment were carried out.

The thus obtained PPS showed the melt viscosity (measured at 310° C. and at a shear rate of 10,000 sec$^{-1}$) of 15 poise, the content of Na of 410 ppm and the amount of extracted Na$^+$ of 130 ppm.

COMPARATIVE EXAMPLE 11

In the same manner as in Example 1 except for carrying out the 2nd polymerization (the two-phase separation polymerization) at a reaction temperature of 330° C. instead of 262° C. in Example 1, the polymerization and the after-treatment were carried out.

The liquid reaction mixture after the 2nd polymerization reaction was found to be decomposed into a black matter giving out a bad smell.

The thus formed PPS showed a black colour and its melt viscosity (measured at 310° C. and at a shear rate of 10,000 sec$^{-1}$) was not more than 3 poise.

COMPARATIVE EXAMPLE 12

In the same manner as in Example 1 except for washing the granular PPS with pure water of pH of 6.6 instead of washing with an aqueous 1% solution of ammonium chloride in Example 1, the polymerization and the after-treatment were carried out.

The thus formed PPS showed the melt viscosity (measured at 310° C. and at shear rate of 10,000 sec$^{-1}$) of 90 poise, the content of Na of 620 ppm and the amount of extracted Na$^+$ of 200 ppm.

COMPARATIVE EXAMPLE 13

In the same manner as in Example 1 except for washing the granular PPS with an aqueous solution of hydrogen chloride of pH of 3.9 instead of washing with an aqueous 1% solution of ammonium chloride in Example 1, the polymerization and the after-treatment were carried out.

The thus formed PPS showed the melt viscosity (measured at 310° C. and at a shear rate of 10,000 sec$^{-1}$) of 60 poise, the content of Na of 250 ppm and the amount of extracted Na$^+$ of 150 ppm.

COMPARATIVE EXAMPLE 14

Into an autoclave of 1 liter, 276.7 g of NMP and sodium sulfide containing 61.4% by weight of Na$_2$S (1.0 mol as Na$_2$S) were introduced, and the content of the autoclave was heated slowly to 202° C. in a nitrogen atmosphere within 2 hours under agitation to distill 23 g of water, 10 g of NMP and 0.01 mol of hydrogen sulfide out from the autoclave.

After cooling the reaction system to 175° C., 1.02 mol of p-DCB and 50 g of NMP were introduced into the system, and the reaction system was subjected to polymerization for 3 hours at 245° C. in a nitrogen atmosphere. After the reaction was over, the half of the reaction mixture was introduced into water, and the thus formed polymer was recovered by filtration. The thus recovered polymer was washed 8 times with hot water and was dried at 80° C. under a reduced pressure. The thus obtained PPS showed the melt viscosity (measured at 310° C. and at a shear rate of 10,000 sec$^{-1}$) of 30 poise, the content of Na of 750 ppm and the amount of extracted Na$^+$ of 320 ppm.

The remaining half of the reaction mixture was subjected to the same after-treatment as in Example 1. The thus obtained PPS showed the melt viscosity (measured at 310° C. and at a shear rate of 10,000 sec$^{-1}$) of 20 poise, the content of Na of 350 ppm and the amount of extracted Na$^+$ of 180 ppm.

COMPARATIVE EXAMPLE 15

Into an autoclave of 1 liter, 276.7 g of NMP, sodium sulfide containing 61.4% by weight of Na$_2$S (1.0 mol as Na$_2$S) and 1.0 mol of sodium acetate trihydrate were introduced, and the content of the autoclave was slowly heated to 205° C. within 2 hours under agitation to distill 72 g of water, 7 g of NMP and 0.02 mol of hydrogen sulfide out from the autoclave.

After introducing 1.02 mol of p-DCB and 50 g of NMP into the autoclave, the total content of the autoclave was subjected to polymerization at 245° C. for 3 hours in a nitrogen atmosphere.

After the reaction was over, the reaction mixture was subjected to the same after-treatment as in Comparative Example 14. The PPS obtained by introducing the reaction mixture into water showed the melt viscosity (measured at 310° C. and at a shear rate of 10,000 sec$^{-1}$) of 800 poise, the content of Na of 850 ppm and the amount of extracted Na$^+$ of 360 ppm.

The PPS obtained by the same after-treatment as in Example 1 showed the melt viscosity (measured at 310° C. and at a shear rate of 10,000 sec$^-$) of 580 poise, the content of Na of 220 ppm and the amount of extracted Na$^+$ of 90 ppm.

What is claimed is:

1. A process for producing a poly(arylene suflide) having a content of an alkali metal of not more than 50 ppm and a melt viscosity, measured at 310° C. and at a shear rate of 10,000 sec$^{-1}$, of from 10 to 300 poise, which process comprises:

(a) reacting a dihalo aromatic compound with an alkali metal sulfide, in an amount of from 1.0 to 2.0 mol of the dihalo aromatic compound per mole of the alkali metal sulfide at a temperature of from 180° to 235° C. in the presence of from 0.5 to 2.4 mol of water per mol of the alkali metal sulfide so that a conversion percentage of the dihalo aromatic compound is not less than 50 mol % of the theoretical conversion percentage and the melt viscosity, measured at 310° C. and at a shear rate of 10,000 sec$^{-1}$, of the thus formed poly(arylene sulfide) is less than 5 poise;

(b) adding water to the thus obtained reaction mixture so that from 2.5 to 7.0 mol of water is present per mol of the alkali metal sulfide and at the same time, heating the reaction mixture to a temperature of from 250° to 290° C., thereby continuing the reaction so that the melt viscosity, measured at 310° C. and at a shear rate of 10,000 sec$^{-1}$, of the thus formed poly(arylene sulfide) is not less than 5 times of that of the poly(arylene sulfide) formed in step (a) and not more than 300 poise; and (c) after separating the thus formed poly(arylene sulfide) from the polymerization reaction mixture of step (b), treating the thus obtained poly(arylene sulfide) in an aqueous solution of a strong acid having a pH of less than 2 or in an aqueous 0.1 to 30% by weight solution of a salt of the strong acid and a weak base at a temperature of from 0° to 200° C. for from 1 to 500 minutes.

2. The process according to claim 1, wherein the pH of the aqueous solution of the strong acid is not more than 1.

3. The process according to claim 1, wherein the concentration of the salt of the strong acid and the weak base is 0.5 to 20% by weight.

4. The process according to claim 1, wherein the treating temperature of step (c) is 15° to 100° C.

5. The process according to claim 1, wherein the strong acid is hydrochloric acid, sulfuric acid or phosphoric acid, and the salt of the strong acid and the weak base is an ammonium salt of the strong acid.

6. The process according to claim 1, wherein the thus separated poly(arylene sulfide) of step (c) is washed with an organic solvent and water is advance of the treatment with the aqueous acidic solution.

7. The process according to claim 1, wherein the thus treated poly(arylene sulfide) of step (c) is washed with an organic solvent and water.

8. The process according to claim 6, wherein the organic solvent is acetone or methanol.

* * * * *